Jan. 20, 1953 — R. RASMUSSEN — 2,626,066
ALTERNATE TIPPING VALVE
Filed Sept. 29, 1947 — 4 Sheets-Sheet 1

Inventor
Robert Rasmussen
By Alfred W. Knight
Attorney

Inventor
Robert Rasmussen

Jan. 20, 1953          R. RASMUSSEN                2,626,066
                   ALTERNATE TIPPING VALVE
Filed Sept. 29, 1947                        4 Sheets-Sheet 4

Inventor
Robert Rasmussen
By Alfred W. Knight
                Attorney

Patented Jan. 20, 1953

2,626,066

UNITED STATES PATENT OFFICE 2,626,066

ALTERNATE TIPPING VALVE

Robert Rasmussen, Detroit, Mich.

Application September 29, 1947, Serial No. 776,739

1 Claim. (Cl. 214—17)

The present invention relates generally to valve construction, and more especially to alternate tipping valves which are adapted to handling fluent or mobile solid materials. Valves of this character may be used for any one of a number of purposes in regulating or controlling the flow of materials, as for example in feeding powdered fuel into a furnace, or in merely transferring materials from one chamber to another under a differential air pressure, as for example transferring from a hopper dust or other divided solid material collected therein.

Since my invention has been particularly designed and adapted to a use of this latter character in which dust collected by cyclone-type dust collectors is transferred from the hopper beneath the collectors to a discharge conduit, I show and describe the invention in this particular embodiment. However, it will be realized that my invention is not limited to any particular use of the tipping valve nor to any particular material handled thereby.

Various difficulties have been encountered with known types of valves, which have been overcome by my improved construction. Experience with conventional types of dust valves has been to the effect that they are subject to constant trouble and breakdown which has very often been found to be caused by rotation of the drive shaft in the wrong direction, either through ignorance or inadvertence of the workman. Although attention has been given to devising a foolproof operating mechanism capable of permitting reverse operation of the valve, such mechanisms have not always been entirely effective for this purpose. As a result of such reverse operation, the valve may be very easily put out of operation causing an entire plant to be shut down for an extended period. The indirect losses of such breakdown often exceed by many times the cost of repair.

Valves of this type are often subject to excessive wear, either as an inherent result of their design or as a result of exposure of the parts to abrasive action of the dust handled by the valve. This wear not only necessitates frequent repair and replacement of parts, but may cause unexpected failure of the valve, shutting down a large amount of other equipment.

Known types of valves have often been relatively expensive because of excessive and complicated machining operations involved in making complex castings, machining driving cams and bearings for moving parts, finishing valve seats, and the like. All of this makes repairs slow and relatively expensive.

Thus it is a general object of my invention to provide an alternate tipping valve construction in which the drive mechanism is capable of motion in either a forward or a reverse direction with satisfactory operation of the valve and without damage to any of the parts.

It is another object of my invention to provide an alternate tipping valve construction in which the wear on all moving parts is reduced to a minimum, and the parts are shielded or removed from direct exposure to dust passing through the valve.

It is also an object of my invention to provide a valve in which the operating mechanism is removed as far as possible from the material being handled so that the valve is adapted to handle materials at relatively high temperatures without overheating or damaging any portions of the valve.

A further object is to provide a valve of relatively simple and inexpensive construction, so that the valve can be manufactured and maintained economically.

A still further object of my invention is to provide a valve closure construction such that the closure member is able to compensate automatically for wear on the valve seat or on the closure member.

The above and other objects of my invention have been attained by placing in a material conveying conduit two spaced valve seats each having a valve closure member which is pivotally mounted to swing between an open position and a closed position relative to the valve seat and providing means biasing each valve closure member toward a normally closed position and valve operating mechanism adapted to open the valves in succession against such biasing means. The valve opening mechanism comprises generally a drive shaft located intermediate the two valves and provided with a crank, and a pair of connecting links attached at one end to the crank on the drive shaft and each connected at the other end to an operating arm connected to one of the valve closure members. The connection between the connecting link and the associated operating arm is of a pin-and-slot type permitting relative movement between the link and the arm during a portion of the operating cycle.

The valve closure members are pivotally mounted at one side of the valve seats which ordinarily lie in planes inclined to the vertical. By this arrangement the pivotal mounting for the closure member is at one side of and above the valve seat and the opening therein. The mounting thus is removed from the path of the dust passing through the opening. This substantially eliminates introduction of abrasive dust into the bearing.

The two valves are contained in two similar separable housings which together form a dust conveying conduit. Each of the valves includes a removably mounted dust tube with a flange at one end. In the case of the lower dust valve, this flange is gripped between the two separable portions of the housing, permitting simple removal and replacement of the valve when necessary.

How the above objects and advantages of my invention have been attained, as well as others not specifically mentioned herein, will be more readily understood by reference to the following description and the annexed drawings, in which.

Figure 1:
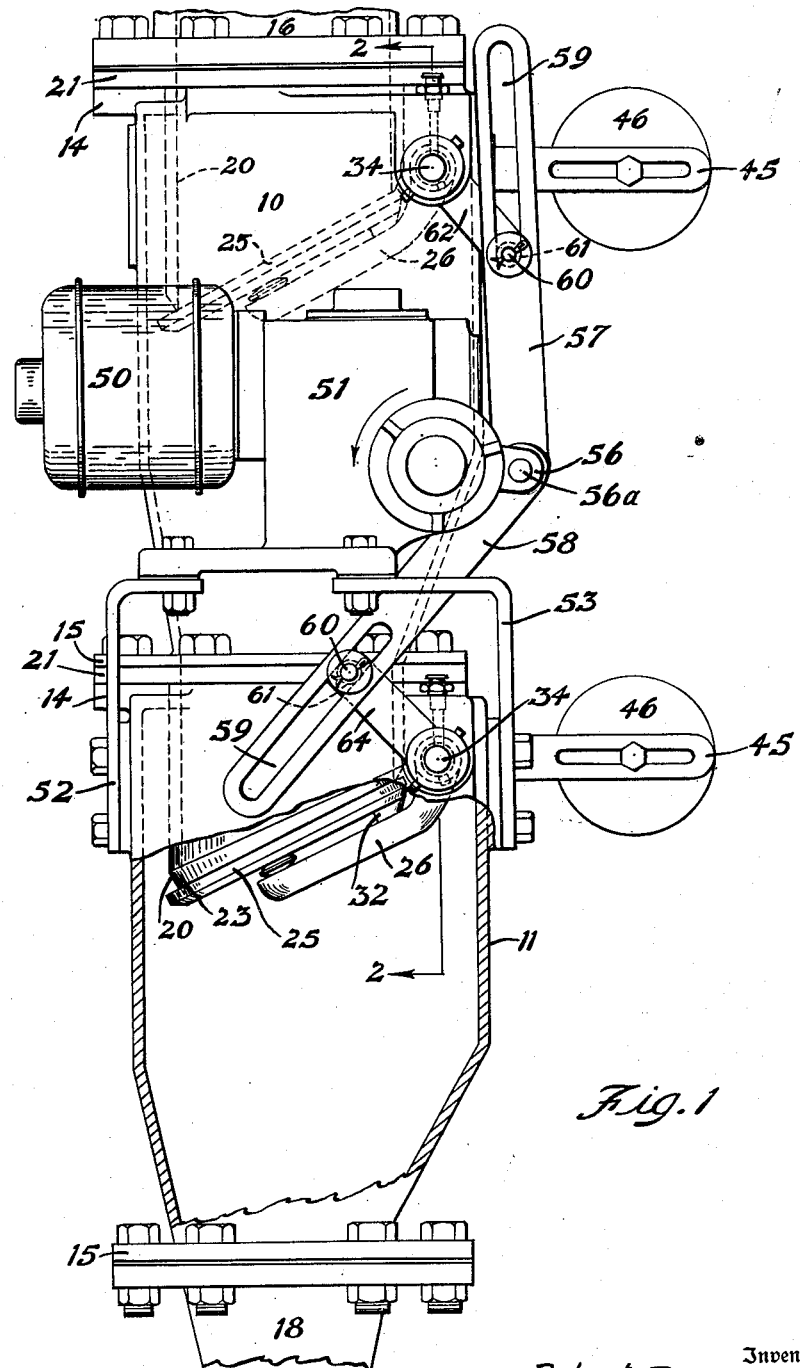
Fig. 1 is a side elevation of an alternate tipping valve construction according to my invention, a portion of the lower housing being broken away to show the lower valve.

Figs. 5 to 10 inclusive are diagrams showing successive positions of the two valve closure members and the operating mechanism throughout one complete cycle of operation.

Referring now to the drawings, it will be seen that the tipping valve comprises two valve housings or bodies 10 and 11 within which the upper and lower valves respectively are contained. As will be seen from the following description, the two valves and their housings are alike in all essential details of construction; and a description of one valve is intended, where applicable, as a description of the other valve also. Housing 10 is mounted on top of housing 11 with the axes of the housings concentric and substantially vertical. Housings 10 and 11 together form a single housing which is in two separable parts, this combined housing serving as a material conveying conduit the axis of which will normally be downwardly extending since it is anticipated that the material will be conveyed through the conduit by gravity. However, the axis of the conduit is not necessarily limited to a vertical position, since it may be inclined to the vertical by a considerable amount.

At its upper end, each housing 10 and 11 has a circular flange 14, and at its lower end a similar circular flange 15. By means of its flange 14, the upper housing 10 is attached to a flange on the lower end of delivery conduit 16 through which material is delivered to the valve. Bottom flange 15 of upper housing 10 is attached to flange 14 of lower housing 11 to provide a continuous material conveying conduit through the valve assembly; while bottom flange 15 of the lower valve is attached to a discharge pipe 18. The material passing through the valve may be discharged by pipe 18 into any suitable type of apparatus for processing or into a conveyor taking it to any particular place desired.

Figure 3:
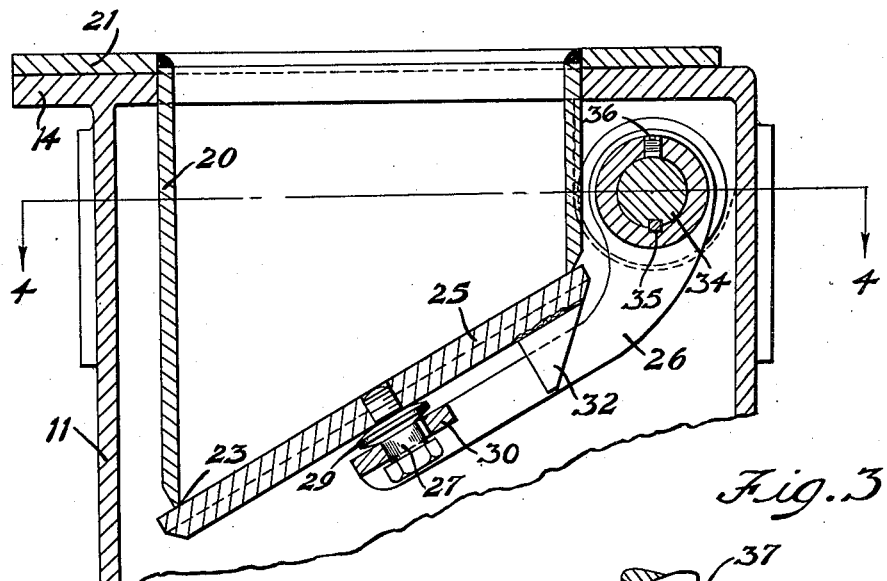
Fig. 3 is an enlarged fragmentary median vertical section through the lower valve, looking toward the right in Fig. 2.
Figure 4:
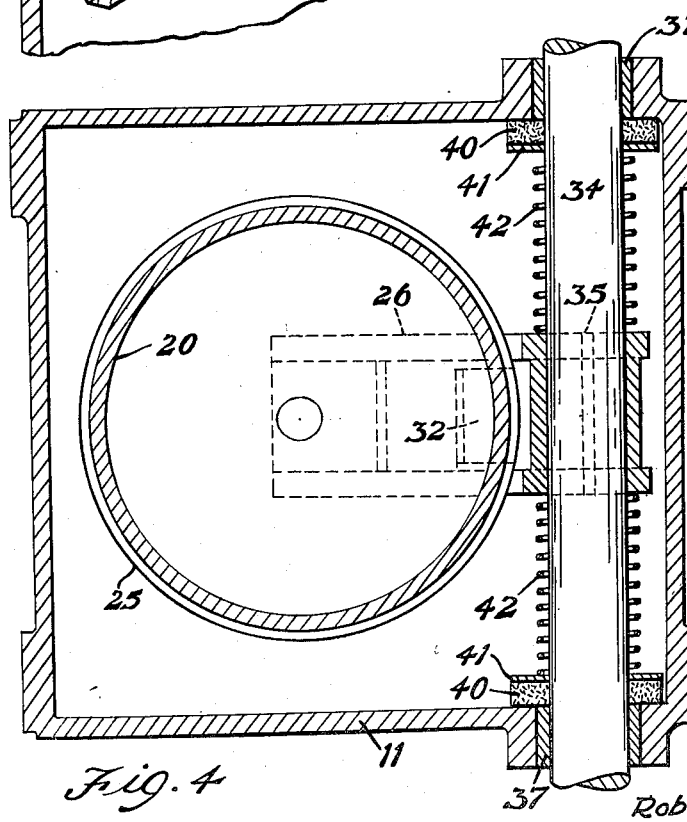
Fig. 4 is a horizontal section on line 4—4 of Fig. 3.
Figure 5:
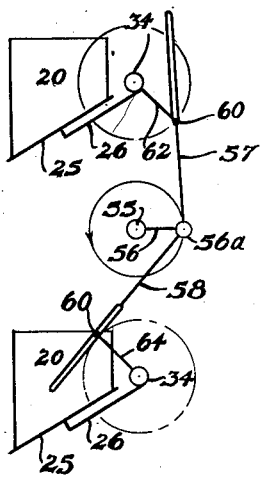
Figure 7:
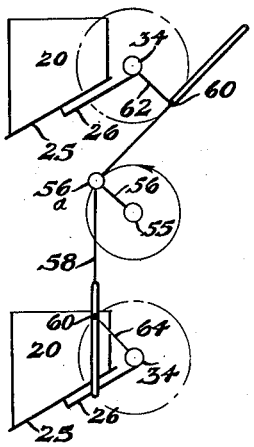

Within each of housings 10 and 11, is a cylindrical dust tube 20 suspended at its upper end from flange 21 which rests upon top flange 14 of the housing. The axis of dust tube 20 is parallel to the axis of the housing, and hence may be described as downwardly extending; although under normal circumstances the axis of the dust tube will be vertical or substantially so. The lower end of dust tube 20 terminates in an opening which lies in a plane oblique to the axis of the tube, and also to the axis of the dust conduit. As shown best in Figs. 1 and 3, the lower end of the dust tube is preferably bevelled so that the bottom edge of the tube can be ground to a perfectly plane valve seat 23.

Each dust tube 20 slides into its housing through a hole in the top at flange 14; and can be removed easily from the housing by withdrawing it when the housing is taken out of the assembly. The lower tube 20 has its flange 21 gripped between the upper and lower flanges of valve housings 11 and 10 respectively, so that these housings are separated to remove the dust tube. A removable dust tube has the great advantage that it is relatively easy to finish a valve seat on the lower end of the tube.

The dust tube is similarly arranged in each of housings 10 and 11, so that there are two vertically spaced valve seats, arranged one above the other within the material conveying conduit formed by the two housings. Each of the valve seats lies in a plane oblique to the axis of the conduit; and these two oblique planes are preferably parallel to each other.

At each valve seat there is a valve closure member 25 in the form of an elliptical plate having an outline slightly larger than valve seat 23 and machined on its top face to a smooth finish to fit tightly against seat 23. Valve closure member 25 is pivotally mounted by means of arm 26 to swing between an open position and a closed position against the valve seat, which is the position of both valve closure members shown in Figs. 1 and 3.

Each closure member 25 is mounted on pivoted arm 26 by means of shoulder bolt 27 threaded into the closure member and screwed up tightly with the shoulder on the bolt against the under surface of plate 25. The enlarged portion of shoulder bolt 27 is loosely mounted in a transversely extending plate 30 which forms a part of arm 26, and holds a tapered washer 29 between closure member 25 and the upper surface of arm 26. By means of this construction, the closure member can rock or shift bodily to a limited extent with respect to arm 26 and valve seat 23 in order to always bring the plane of the upper surface of the closure member exactly into the plane of the valve seat. The loose mounting of the shoulder bolt in arm 26 permits self-centering or self-seating movement of the closure member that automatically insures a tight fit of member 25 against the valve seat. The effects of minor wear or lodgement of dust particles on the valve seat are thus minimized or compensated for.

Arm 26 is bifurcated or recessed to receive lug 32 on the under side of plate 25 which holds the valve closure member from rotation about the axis of bolt 27 with respect to arm 26.

Each arm 26 is mounted upon a shaft 34 and held against rotation with respect thereto by key 35. Set screw 36 is provided to hold arm 26 against longitudinal movement along shaft 34.

Shaft 34 is journaled in bushings 37 fitting within drilled holes in opposite walls of the valve housing. A dust seal for the bearing at each side of the housing is provided in the form of felt washer 40 surrounding shaft 34 and bearing against the inner housing face to cover the bearing within bushing 37. Felt washer 40 is held in place by a metal washer 41 and compression spring 42 held between metal washer 41 and the end of the hub of arm 26.

Shaft 34 is located at one side of dust tube 20 so that it does not intersect the tube, thus simplifying construction. Shaft 34 is also located at the top side of inclined valve seat 23 and substantially entirely above the valve seat. This construction places shaft 34 and its bearings at 37 completely out of the path of normal travel of dust or other material passing through dust tube 20. In this way, the moving parts are to a large extent protected against contamination by dust particles which may be abrasive and cause excessive wear of the moving parts.

Figure 2:
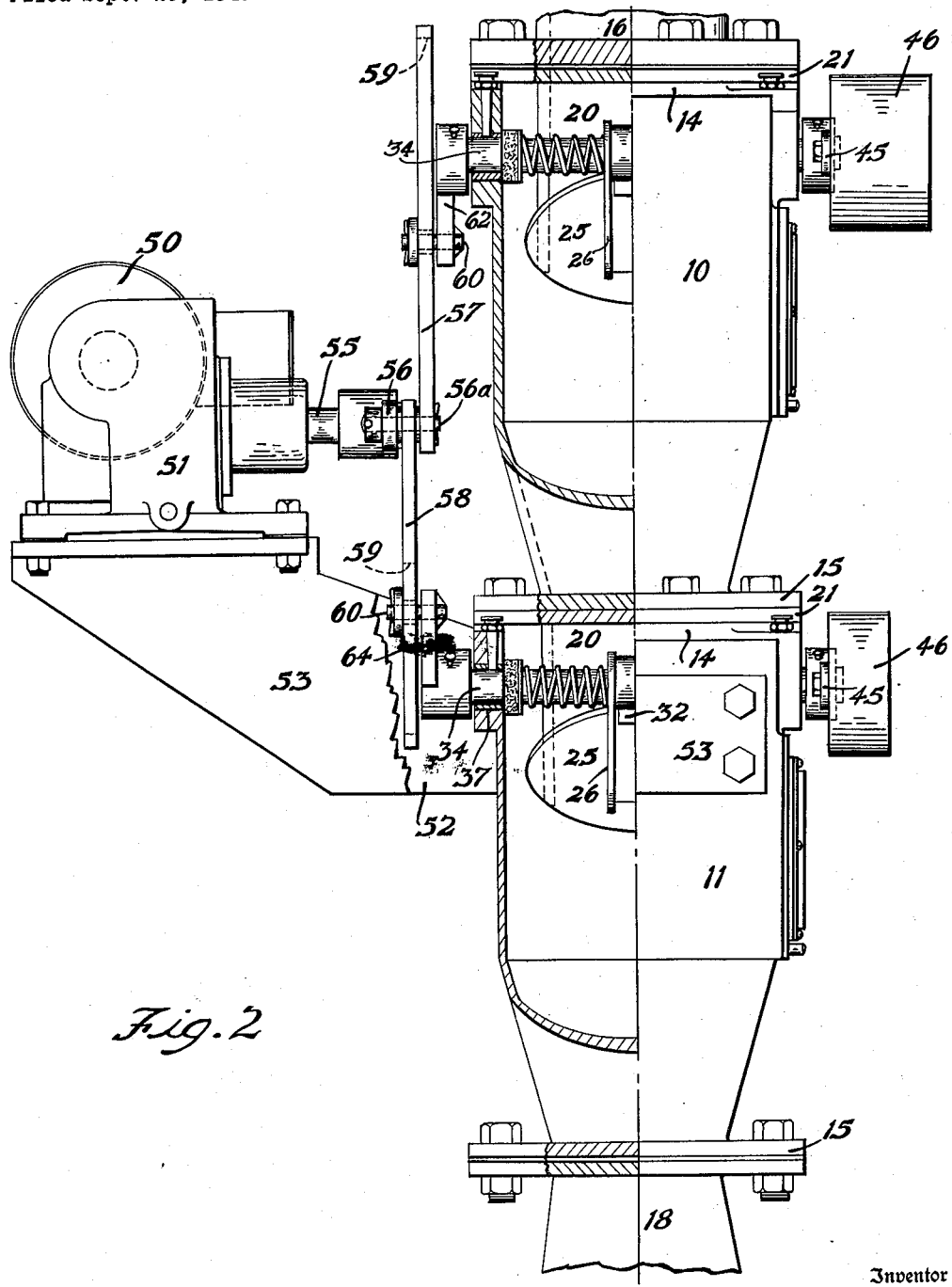
Fig. 2 is a combined front elevation and vertical section through the valve of Fig. 1, the section being taken on line 2—2 of Fig. 1.

On one end of each shaft 34, as may be seen in Fig. 2, there is fastened an arm 45 upon which is slidably mounted counterweight 46. This counterweight is preferably, though not necessarily, slidably mounted in order that its effect may be varied and the operation of the valve adjusted to different conditions. As viewed in Fig. 1, valve closures 25 are movable from their respective valve seats 23 by rotation of shafts 34 in a counterclockwise direction. Counterweights 46 are so attached to shafts 34 that they normally tend to rotate the associated shaft in a clockwise direction. In this way each valve closure member is gravity biased toward a closed position. Counterweight 46 is sufficiently heavy to cause the closure member to be firmly seated against the associated valve seat. It will be realized that it is within the scope of my invention to provide other means, as for example springs, for biasing the valve closure member toward a closed position.

The valve operating mechanism for opening the valve comprises generally a motor, a drive shaft driven by the motor, and a pair of links actuated by the drive shaft and attached to arms on shafts 34. Electric motor 50 is shown in Figs. 1 and 2 as being mounted directly upon speed reducer 51 which is supported upon brackets 52 and 53 mounted on opposite sides of valve housing 11. The output shaft 55 from the speed reducer is the drive shaft, and carries crank 56 near one end. A pair of driving links 57 and 58 are both connected at one end to crank 56 by pin 56a. The other end of each link 57 and 58 is slotted, as at 59, to slidably receive a pin 60. The upper shaft 34 has rigidly attached to it operating arm 62; and a pin 60 is fastened in the outer end of arm 62 to slide within slot 59 of link 57. By a similar construction, lower shaft 34 is provided with operating arm 64 which carries at its outer end a pin 60 which slides within slot 59 in link 58. Each pin 60 carries a loosely fitting sleeve 61 of a size to fit within slot 59 and act as an anti-friction roller or bearing. Each arm 62 and 64 is thus connected to its driving link, 57 or 58 respectively, by a lost-motion type of connection which permits the link to move independently of the arm for a part of each revolution of drive shaft 55, as will become evident. The pin-and-slot connection is typical of lost-motion connections in general and other specific forms may be used. The two operating arms 62 and 64 are of equal length and have parallel axes when the valves are closed and occupy the positions of Fig. 1. However, it will be noted that arm 62 extends downwardly from shaft 34, while arm 64 extends upwardly; that is, the two operating arms occupy positions spaced 180° apart with respect to their associated shaft 34.

The operation of this valve opening means is simple, and successive positions of it are shown in Figs. 5 to 10 inclusive, assuming that drive shaft 55 and crank 56 rotate in a counterclockwise direction when viewed as in Fig. 1. Figs. 5 to 10 are diagrammatic representatives of the various operating parts, and assume that the cycle of operation starts when the valves are closed, as in Fig. 1, which is substantially the position of the parts shown in Fig. 5. Rotation of crank 56 counterclockwise moves operating link 57 upward and outward longitudinally of the link. Pin 60 is seated at the lower end of slot 59 in the link, so that the motion of the link is transmitted through pin 60 to arm 62 which is rotated counterclockwise to open the upper valve by moving the valve closure member downwardly away from the valve seat. As crank 56 rotates from the position of Fig. 5 to that of Fig. 6, the upper valve is opening until it has reached its fully opened position, shown in Fig. 6.

Figure 6:
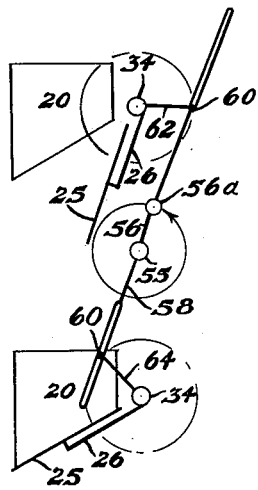

As crank 56 rotates onwardly from the position of Fig. 6, the effective length of the crank and link 57 shortens and link 57 is drawn downwardly by the rotating crank. As the crank moves to the position of Fig. 7, no pressure is exerted by link 57 on arm 62; rather the valve closure member is returned to its seated position by rotation of shaft 34 in a clockwise direction under the influence of counterweight 46. When the parts reach the position of Fig. 7, the upper valve is again fully closed.

Figure 8:
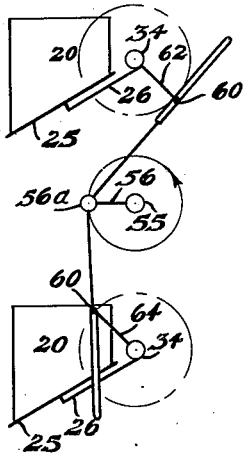

During the movement just described, the lower pin 60 on arm 64 has remained stationary, and has been sliding within slot 59 with respect to link 58. Consequently, the position of the lower valve has not changed. This relative motion of the link and pin continues as crank 56 moves from the position of Fig. 7 to that of Fig. 8, which is 180° removed from the position of Fig. 5. In the position of Fig. 8, the opening of the lower valve commences, since by now the pin has reached the upper end of the slot in link 58 and continued rotation of crank 56 applies pressure upon arm 64 through pin 60 and link 58.

Continued rotation of crank 56 opens the lower valve by rotation of lower shaft 34 and its arm 26 in a counterclockwise direction which causes the valve closure plate to move downwardly away from the valve seat. This is in opposition to the biasing action of counterweight 46. Pressure is applied to operating arm 64 by link 58 continuously as the parts move from the position of Fig. 8 to the position of Fig. 9 in which the valve is fully opened, and arm 64 has reached the end of its counterclockwise rotation.

Figure 9:
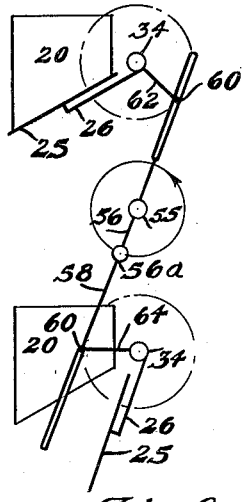
Figure 10:
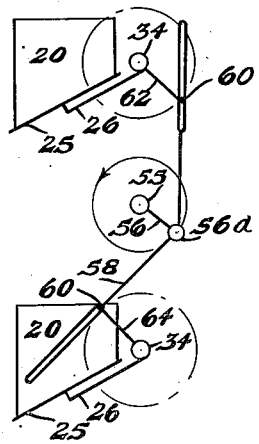

As the crank moves from the position of Fig. 9 to the position of Fig. 10, pressure by link 58 on pin 60 and arm 64 is relieved and the valve closure member is again returned to its position against the valve seat by clockwise rotation of shaft 34 and arm 26 under the biasing action of counterweight 46. When the parts are in the position of Fig. 10, the lower valve is again fully closed; and no motion of the upper valve has taken place during the opening and closing of the lower valve. No further motion of either valve takes place as crank 56 completes the cycle by returning to the position of Fig. 5 at which point another complete cycle, the same as has just been described, commences.

From the description of the construction of the valve opening mechanism and of its operation, it will be appreciated that the mechanism functions to open and close the valve successively through the same cycle of operation if the main drive shaft 55 is rotated in a clockwise direction. Assuming a clockwise direction and that the parts are initially in the position of Fig. 5, then the parts of the valve operating mechanism and the valve occupy in succession the positions shown by Figs. 10, 9, 8, 7 and 6, then returning to the position of Fig. 5. While the motions of crank 56 and the two connecting links 57 and 58 are reversed, the motions of the valve closure members and their connecting arms are unchanged. Reversal of the rotation of shaft 55 merely means that starting from any given point, motion is initially applied to the other valve than is the case when the shaft rotates counterclockwise. To make operation not only possible, when shaft 55 is reversed, but smooth and with the same cycle, it is preferred to place the axes of both shafts 34 and drive shaft 55 in a common plane, or substantially so, as shown by the drawings. Ordinarily the plane is vertical.

Having described a preferred embodiment of my invention, it will be evident that various changes in the details and arrangement of parts may be made by persons skilled in the art without departing from the spirit and scope of my invention; and consequently I wish it understood that the foregoing description is considered as being illustrative of, rather than restrictive upon, the appended claim.

I claim:

In an alternate tipping valve construction having a material conveying conduit, two spaced valve seats in the conduit, two valve closure members each pivotally mounted to swing between an open position and a closed position relative to one of the valve seats, and means biasing each valve closure member toward a closed position, the combination comprising: an operating arm rigidly connected to each of the valve closure members to swing about the axis of the pivotal mounting of the closure member, the two valve operating arms being substantially parallel to each other when the valve closure members are in closed position but extending in opposite directions radially from their respective axes of rotation; a drive shaft located midway between the two axes of rotation of said operating arms with its axis lying in a plane containing the two axes of the operating arms; a crank rigidly connected to the drive shaft; a pin on each of the operating arms near the outer end thereof; and a pair of rigid driving links connected at one end to the crank and each having a longitudinally extending slot receiving the pin on a different one of the operating arms whereby the valve closure members are moved in succession to open positions by the links and to closed positions by the biasing means when the drive shaft rotates.

ROBERT RASMUSSEN.

REFERENCES CITED

The following references are of record in the file of this patent:

UNITED STATES PATENTS

| Number | Name | Date |
|---|---|---|
| 151,548 | Schmitz | June 2, 1874 |
| 327,875 | Hall | Oct. 6, 1885 |
| 441,725 | Walker | Dec. 2, 1890 |
| 871,428 | Miller | Nov. 19, 1907 |
| 971,510 | Tilden | Sept. 27, 1910 |
| 1,112,641 | Moeller | Oct. 6, 1914 |
| 1,298,426 | Weber | Mar. 25, 1919 |

FOREIGN PATENTS

| Number | Country | Date |
|---|---|---|
| 315,566 | Great Britain | July 18, 1929 |
| 548,498 | Germany | Apr. 13, 1932 |